INVENTOR.
WILLIAM B. WESTCOTT, Jr.
ATTORNEY

United States Patent Office 2,856,180
Patented Oct. 14, 1958

2,856,180

COMPRESSIBLE LANDING GEAR

William B. Westcott, Jr., Cleveland Heights, Ohio, assignor to Cleveland Pneumatic Industries, Inc., Cleveland, Ohio, a corporation of Ohio Application October 14, 1955, Serial No. 540,444

5 Claims. (Cl. 267—64)

This invention relates generally to retractable landing gears and more particularly to a new and improved landing gear which can be easily compressed when the gear is retracted so that it will fit into a small storage envelope within the aircraft proper.

In modern aircraft the landing gear is normally retracted into the fuselage or wings after the take-off to reduce drag. It is therefore necessary to provide within the frame of the aircraft space for the storage of the landing gear and wheel. In such aircraft space is at a premium so it is highly desirable to collapse or compress the landing gear as much as possible so as to reduce the amount of storage space necessary. Reduction of the storage space necessary for the landing gear also simplifies the structural design of the aircraft frame since large openings within the frame produce inherent weaknesses and therefore require extra strengthening elements which add to the complexity of manufacture and the total weight.

It is an important object of this invention to provide an aircraft landing gear which may be compressed without the expenditure of large forces.

It is another important object of this invention to provide an aircraft landing gear incorporating means to permit its compression with a force substantially less than the normal rated load when it is desired to retract it into the frame of the aircraft.

Further objects and advantages will appear from the following description and drawings, wherein.

Figures 1, 2, 3:
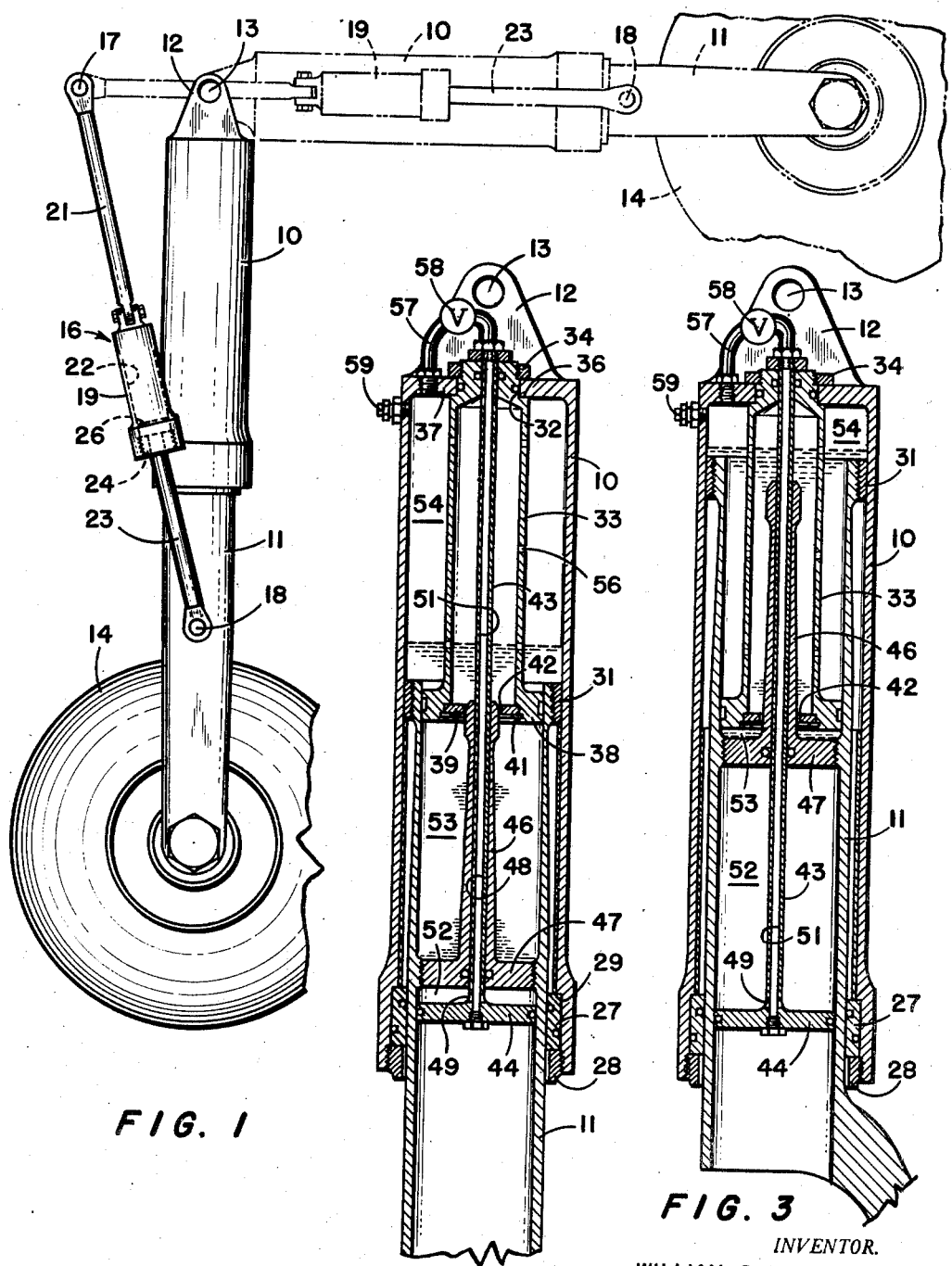
Figure 1 is a side elevation illustrating the operation of a landing gear incorporating this invention showing the means utilized to provide compression of the landing gear as it is retracted.
Figure 2 is an enlarged longitudinal section showing the position of the elements when the landing gear is in the fully extended position; and, Figure 3 is a longitudinal section similar to Figure 2 showing the position of the elements when the landing gear is in the compressed position.

Referring to the drawings, a landing gear according to this invention is provided with upper and lower telescoping members 10 and 11 respectively wherein the upper telescoping member 10 is provided with a bifurcated mounting portion 12 adapted to be pivoted on the frame of the aircraft for rotational movement around a pivot axis 13 and a ground engaging wheel 14 is journaled on the lower telescoping member 11. The landing gear is movable between the vertical or lowered position shown with solid lines in Figure 1 and the compressed and retracted position shown in phantom in Figure 1. Suitable actuating means, not shown, mounted between the landing gear and the frame of the aircraft can be utilized to provide the power necessary to retract the gear. The upper and lower telescoping members 10 and 11 are axially movable relative to each other between the fully extended position and the compressed position and urged toward the extended position by pressure fluid contained therein.

An operating mechanism 16 is pivoted at its upper end to the frame of the aircraft for motion around the axis of the pivot 17 which is spaced from the pivot axis 13 and at its lower end to the lower telescoping member 11 at 18. A collapsible portion is provided in the operating mechanism to prevent it from transmitting compression loads. To provide this connection a cylinder 19 is connected to an upper link 21 and provided with an axial bore 22 adapted to receive the upper end of a lower link 23. A cap member 24 is threaded into the lower end of a cylinder 19 and it is proportioned to engage a head 26 formed on the lower link 23 and prevent the head from moving out of the cylinder 19. In normal landings, upward motion of the lower telescoping member 11 merely causes the lower link 23 to move axially into the cylinder 19 and causes the head to move upwardly within the bore 22. However the head 26 is proportioned to engage the cap 24 when the landing gear is fully extended and prevents the operating mechanism from extending beyond the position shown in Figure 1. Therefore the operating mechanism will not interfere with the normal operation of the landing gear but is capable of producing a force to compress the gear upon its retraction.

A comparison of the extended position and the retracted position shown in phantom in Figure 1 clearly shows the retraction compression operation. When the gear is retracted to the position shown in phantom, the operating mechanism 16 produces a force on the lower telescoping member 11 which pulls it in a direction toward the upper telescoping member 10 to the compressed position. By utilizing this operating mechanism no power source other than the power source of the retraction mechanism is necessary to compress the gear as it is retracted.

Reference should now be made to Figures 2 and 3 wherein the structural details of the landing gear itself are shown. A gland member 27 provided with suitable seals is mounted on the lower end of the upper telescoping member 10 between a gland nut 28 and a shoulder 29 formed on the upper telescoping member 10. A radial bearing 31 is mounted at the upper end of the lower telescoping member 11 and is proportioned to engage the inner wall of the upper telescoping member 10 at a point vertically spaced from the gland member 27 so that the two telescoping members are supported by the gland member 27 and the bearing 31 against relative lateral motion at two spaced points.

The upper end of the upper telescoping member 10 is formed with an opening 32 through which projects the upper end of a plunger tube 33. The plunger tube is firmly attached to the upper telescoping member by a lock nut 34 which holds a shoulder 36 formed on the plunger tube 33 against a radial wall 37 adjacent to the opening 32. The lower end of the plunger tube 33 is formed with a flanged portion 38 which engages the inner wall of the lower telescoping member 11 while permitting relative axial motion therebetween. An orifice plate 39 mounted on the lower end of the plunger tube 33 by means of a snap ring 41 is formed with a central orifice 42. A rigid tube 43 is mounted at its upper end on the plunger tube 33 and is fixed against motion relative thereto. The lower end of the rigid tube 43 is formed with a flange 44 which extends radially out into engagement with the inner wall of the lower telescoping member 11. A bulkhead 47 formed with a metering pin 46 is mounted in the lower telescoping member 11 above the flange 44 and is provided with a central bore 48 through which the rigid tube 43 extends. A port 49 in the rigid tube 43 provides fluid communication with the tube passage 51 and a first chamber or cavity 52 defined between the flange 44 and the bulkhead 47. A second chamber 53 is defined between the bulkhead 47 and the flange 38 which is in fluid communication with a third chamber 54 through the orifice 42. It should be understood that the third chamber 54 includes the zone around the plunger tube 33 as well as the zone within the plunger tube 33 and that fluid communication is provided between these zones through a plurality of ports 56 formed in the plunger tube. The two chambers 53 and 54 cooperate to form the cavity which contains the pressure fluid utilized to support the aircraft when it is on the ground.

The upper end of the tube passage 51 is connected to the third chamber 54 through piping 57 and a valve 58. The valve 58 is a simple on/off valve which is normally closed thus isolating the third chamber 54 from the passage 51 and in turn the first chamber 52. However, it may be opened to provide fluid communication between the first chamber 52 and the third chamber 54 through the passage 51 when it is desired to compress the landing gear for retraction. Suitable seals are provided on the various elements to prevent leakage between the chambers and out of the strut.

In operation the second chamber or cavity 53 is filled with liquid when the landing gear is in the extended position shown in Figure 2 through a charging port 59. Preferably enough liquid is provided to also fill the lower portions of the third chamber 54. The upper portions of the chamber 54 are charged with air under pressure which pressurizes the liquid within both the second and third chambers 53 and 54 due to the connection through the orifice 42. When the landing gear is to be used to support the weight of the airplane on the ground or absorb the landing impact, the valve 58 is closed so that the first chamber 52 is isolated from the other two chambers 53 and 54. Therefore the pressure fluid within the landing gear operates over an area defined within the gland member 27 to produce a reaction force on the lower telescoping member 11 urging it downwardly relative to the upper telescoping member 10. Actually this area is reduced by the cross sectional area of the rigid tube 43. However since this cross sectional area is small when compared with the area within the gland member 27 it need not be considered in the general explanation of the operation.

When the wheel 14 engages the ground during the landing, it forces the lower telescoping member 11 upwardly relative to the upper telescoping member 10 which causes a decrease in the volume of the cavity 53 and a rapid increase in the pressure of the liquid contained therein. This causes the liquid to flow through the orifice 42 into the third chamber 54. The metering pin 46 is preferably contoured to provide a varying resistance to this flow through the orifice 42 during the impact of landing so that a proper load stroke curve will be provided. Most of the impact energy is absorbed by the flow through the orifice 42. When the landing impact energy is absorbed, the lower telescoping member 11 assumes a static position somewhere between the fully extended position of Figure 2 and the fully compressed position of Figure 3 and a substantial portion of the liquid originally contained in the second chamber 53 has passed through the orifice 42 into the third chamber 54 thereby compressing the air within the third chamber. The landing gear will stabilize a static position wherein the force reaction of the pressure fluid within the landing gear acting over the area defined within the gland member 27 produces a downward force on the lower telescoping member 11 equal to the static weight carried by the landing gear. Since the first chamber 52 is isolated from the other chambers at this time, upward movement of the lower telescoping member 11 merely causes a decrease of the pressure therein.

After the aircraft is air-borne and the gear is to be compressed for retraction, the valve 58 is opened to provide fluid communication between the third chamber 54 and the first chamber 52 so the pressure within the three chambers will be equalized. Of course, the two chambers 53 and 54 are connected by flow through the orifice 42 so connection of the first chamber 52 with the third chamber 54 equalizes the pressure in all three chambers. At this time the pressure fluid within the landing gear produces a force reaction tending to move the lower telescoping member 11 downwardly relative to the upper telescoping member 10 wherein the force is determined only by the pressure within the three chambers and the cross sectional area of the lower telescoping member 11 between the flange 44 and the gland member 27. This effective area is less than the area within the gland member 27 by an amount equal to the area of the flange 44. The force reaction on the flange 44 is always transmitted to the upper telescoping member 10 through the rigid tube 43. Since this effective area is substantially smaller than the entire area within the gland member 27, upward movement of the lower telescoping member 11 does not cause substantial compression of the pressure fluid because pressure fluid is displaced from the third chamber 54 to the first chamber during compression through the tube 43. In other words, compression of the gear with the valve 58 open does not cause much compression of the pressure fluid because the volume of the first chamber 52 increases as the volume of the second chamber 53 decreases. Therefore, it is possible to compress the gear during retraction with a force which is considerably less than the force necessary to compress the gear when the valve 58 is closed. However, the landing gear will automatically extend when it is returned to the vertical position after retraction because there is an extension force produced by the pressure fluid acting on the small effective area.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A landing gear comprising inner and outer telescoping members, a bulkhead mounted on said inner member cooperating with both of said members to define a cavity filled with pressure fluid the volume of which is reduced by telescoping movement of said members toward each other, a rigid tube extending through said bulkhead mounted on said outer member and provided with a flange engaging said inner member, said flange and bulkhead cooperating to define a chamber the volume of which is increased by said telescoping movement, valved means connecting said chamber and cavity through said tube, said chamber and cavity normally being isolated whereby said pressure fluid in said cavity is compressed therein upon said telescoping movement between said members, said valve means being operable to provide fluid communication therebetween whereby said telescoping movement causes said pressure fluid to flow from said cavity into said chamber whereby the pressure of said pressure fluid remains relatively constant during said telescoping movement.

2. A landing gear comprising upper and lower telescoping members, a bulkhead mounted on said lower member cooperating with both of said members to define a cavity above said bulkhead filled with pressure fluid the volume of which is reduced by telescoping movement of said members toward each other, a rigid tube extending through said bulkhead mounted on said upper member and provided with a flange engaging said lower member below said bulkhead, said flange and bulkhead cooperating to define a chamber the volume of which is increased by said telescoping movement, valved means connecting said chamber and cavity through said tube, said chamber and cavity normally being isolated whereby said pressure fluid in said cavity is compressed therein upon said telescoping movement between said members, said valve means being operable to provide fluid communication therebetween whereby said telescoping movement causes said pressure fluid to flow from said cavity into said chamber whereby the pressure of said pressure fluid remains relatively constant during said telescoping movement.

3. A landing gear comprising a pair of telescoping members, a bulkhead mounted on one of said members cooperating with both of said members to define a cavity above said bulkhead the lower portions of which are filled with liquid and the upper portions of which are filled with gas under pressure, the volume of said cavity being reduced by telescoping movement of said members toward each other, a rigid tube extending through said bulkhead mounted on the other of said members and provided with a flange engaging said one member below said bulkhead, said flange and bulkhead cooperating to define a chamber the volume of which is increased by said telescoping movement, normally closed valved means connecting said chamber and the gas filled portions of said cavity through said tube, said chamber and said cavity normally being isolated from each other whereby said pressure fluid in said cavity is compressed therein upon said telescoping movement of said members, said valved means being operable to provide fluid communication therebetween whereby said telescoping movement causes said gas to flow from said cavity into said chamber whereby said gas remains at a relatively constant pressure during said telescoping movement.

4. A landing gear comprising an upper telescoping member adapted to be mounted on the frame of an aircraft and a cooperating lower telescoping member on which is mounted a ground engaging element, a bulkhead mounted on said lower member cooperating with both of said members to define a cavity above said bulkhead filled with pressure fluid the volume of which is reduced by telescoping movement of said members toward each other, a rigid tube extending through said bulkhead mounted on said upper member and provided with a flange engaging said lower member below said bulkhead, said flange and bulkhead cooperating to define a chamber the volume of which is increased by said telescoping movement, and valved means connecting said chamber and cavity through said tube, said chamber and cavity normally being isolated whereby said pressure fluid in said cavity is compressed therein upon said telescoping movement between said members, said valve means being operable to provide fluid communication therebetween whereby said telescoping movement causes said pressure fluid to flow from said cavity into said chamber whereby the pressure of said pressure fluid remains relatively constant during said telescoping movement.

5. A landing gear comprising an upper telescoping member adapted to be mounted on the frame of an aircraft and a cooperating lower telescoping member on which is mounted a ground engaging element, a bulkhead mounted on said lower member cooperating with both of said members to define a cavity above said bulkhead filled with pressure fluid the volume of which is reduced by telescoping movement of said members toward each other, a rigid tube extending through said bulkhead mounted on said upper member and provided with a flange engaging said lower member below said bulkhead, said flange and bulkhead cooperating to define a chamber the volume of which is increased by said telescoping movement, valved means connecting said chamber and cavity through said tube operable to provide fluid communication therebetween whereby said telescoping movement causes said pressure fluid to flow from said cavity into said chamber, and means adapted to produce a force effecting said telescoping movement when said valved means are operated to provide said communication thereby reducing the overall size of said landing gear.

References Cited in the file of this patent

UNITED STATES PATENTS

| | | |
|---|---|---|
| 2,559,967 | Katz | July 10, 1951 |
| 2,614,833 | Laugaudin | Oct. 21, 1952 |
| 2,679,827 | Perdue | June 1, 1954 |
| 2,735,634 | Fosness | Feb. 21, 1956 |

FOREIGN PATENTS

| | | |
|---|---|---|
| 782,123 | France | Mar. 11, 1935 |